Patented July 20, 1926.

1,593,106

UNITED STATES PATENT OFFICE.

HYMAN L. SHOUB, OF BROOKLYN, NEW YORK.

MEDICINAL PREPARATION.

No Drawing. Application filed January 21, 1924. Serial No. 687,616.

This invention relates to a preparation for the treatment of diseased gums or other mouth tissue. It is the object of this invention to provide a preparation which will act as an astringent and will also behave as a disinfectant and in a manner to destroy the anaerobic microorganisms of the diseased tissue. It is also the object of this invention to provide a preparation having the above properties and which may be applied by the patient with or without instructions from his physician without any danger of the likelihood of serious consequences.

The main ingredient of my preparation is an oxide of chromium, preferably chromic anhydride, $CrO_3$. This substance when dissolved and applied to diseased tissue of the mouth, particularly in cases of pyorrhea, or vincent angina or trench mouth acts as an astringent. As such it makes the spongy bleeding gums or other tissue firm and healthy and enables it to resist further attacks of the disease more effectively. In addition to this function this substance also behaves as a disinfectant. In my composition, however, the disinfecting properties of the preparation are strengthened by the intimate admixture therewith of a substance which has high disinfecting properties. For this purpose I prefer to use potassium permanganate. This substance also has the property of liberating free active oxygen when it comes in contact with diseased tissue thereby destroying the anaerobic microorganisms. I prefer that this preparation be applied to the tissue in the form of a solution by the aid of a cotton ball. When thus applied the preparation will attack all disease forming and disease sustaining microorganisms lodged in the pus pockets and elsewhere and will at the same time give the tissue a firm and healthy character which will strengthen it against further attack.

The proportional composition of my preparation may be varied between certain limits without materially affecting the resultant effect. The relation of the permanganate to the oxide of chromium may be between the limits of one to fifty to one to two hundred. I prefer to use the proportions of one to one hundred.

The concentration of the solution may be varied between the limits of five per cent and twenty per cent. I prefer a substantially ten per cent solution.

I prefer to prepare an intimate admixture of the dry substances that enter into my preparation and supply dental surgeons or persons who choose to treat their diseased gums with the dry preparation and instructions to dissolve same and the manner of solution. The preparation may, however, be dissolved in the proper proportions and the user supplied with the ready solution; or the user may be supplied with separate solutions of the constituents of the preparation and instructed to mix them in proper proportions before application.

I have found that the above preparation has great efficacy in the treatment of pyorrhea and trench mouth. It also has a cleaning and whitening action on the teeth.

I claim:

1. A preparation for the treatment of diseased mouth tissue comprising an oxide of chromium.

2. A preparation for the treatment of diseased mouth tissue comprising an oxide of chromium and a disinfectant.

3. A preparation for the treatment of diseased mouth tissue comprising oxide of chromium and permanganate.

4. A preparation for the treatment of diseased mouth tissue comprising oxide of chromium and potassium permanganate, the ratio of the former to the latter lying between the limits of fifty to one and two hundred to one.

5. A preparation for the treatment of diseased mouth tissue comprising chromic anhydride and potassium permanganate in proportions substantially one hundred of chromic anhydride and one of potassium permanganate by weight.

In testimony whereof the above named petitioner hereunto affixes his signature.

HYMAN L. SHOUB.